Figure 1:
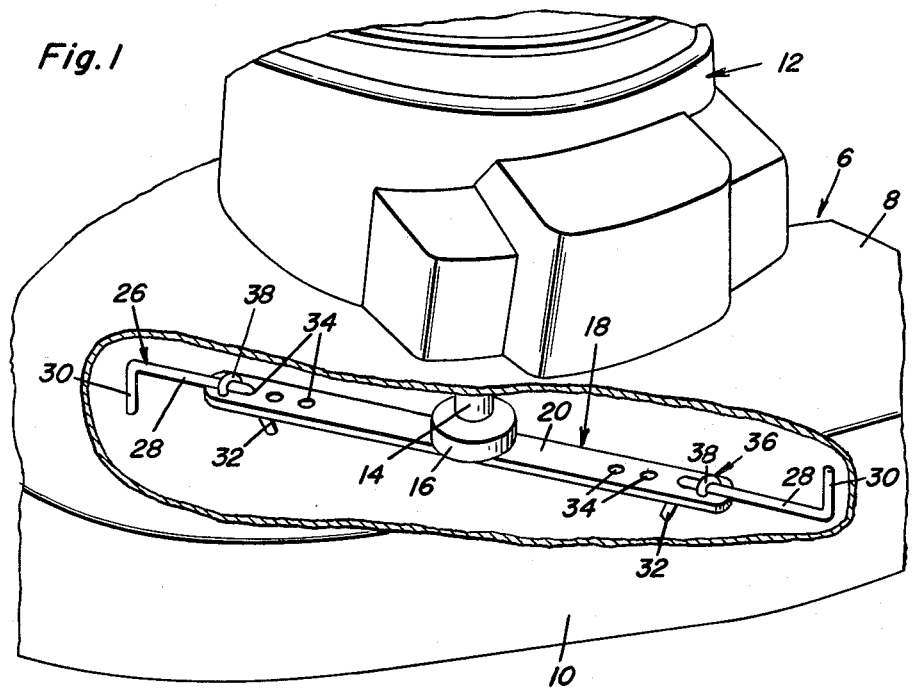

May 25, 1965     L. R. FJELSTAD     3,184,903

ATTACHMENT FOR ROTARY LAWN MOWER

Filed Sept. 25, 1963

Leonard R. Fjelstad
INVENTOR.

United States Patent Office 3,184,903
Patented May 25, 1965

3,184,903
ATTACHMENT FOR ROTARY LAWN MOWER
Leonard R. Fjelstad, R.F.D. 2, Jeffers Road,
Eau Claire, Wis.
Filed Sept. 25, 1963, Ser. No. 311,482
5 Claims. (Cl. 56—25.4)

This invention relates to a conventional-type power operated lawn mower which is distinguishable from prior art adaptations and those in common use in that it is equipped with an improved rotary time and labor saving attachment; that is, a structurally unique attachment characterized by means which whips up and flails dead grass, accumulated dry leaves and debris and, in so doing, prevents undesirable clogging of the blade housing and, what is important, makes raking after mowing unnecessary.

To the ends desired the customary or conventional mower blade is removed after having mowed the lawn and the herein disclosed attachment is substituted therefor. The attachment is basically similar to the conventional-type blade. On the other hand, it is specially designed and different in that the blade-like plate is significantly shorter and is equipped at its respective outer ends with novel flailing means. This means is such in construction and performance that it beats and threshes the grass, leaves and debris. In so doing it flails and whips up the grass (leaves and debris, too) and pulverizes same with such certainty and effectiveness that lumping and caking is eliminated. Consequently, it is seldom if ever necessary to have to stop to unclog and clear the blade space of the mower's housing. The improved end result is so effective that the user is rarely called upon to rake the lawn or go over it a second time. Accordingly, this invention effectually serves the purposes for which it is intended and is destined to appeal to manufacturers, retailers and users.

Briefly the invention has to do, in a combination sense, with a power lawn mower characterized by the usual housing, vertical blade operating shaft and power means connected with and for rapidly turning the shaft. The improved attachment is carried by the bottom of the shaft and is operable within the confines of the housing. Grass beating, pulverizing and anti-clogging fingers are provided. More particularly, the attachment comprises a blade-like bar or plate which is disposed in a horizontal plane and joined at its median portion to the shaft, said plate providing a support and having opposite ends terminating an appreciably short distance from the encompassing skirt portion of the housing. The beating, pulverizing and anti-clogging members or fingers are mounted on the respective outer ends of the bar or plate.

Considered as a substitute for the conventional mower blade and in the sense that it is a ready-to-use-attachment for the shaft the invention is characterized by a rigid elongated blade-like plate or bar constructed at its median portion for operative connection with the shaft. The beating and agitating members or fingers at the respective ends of the plate are basically the same in construction. Each is characterized by an L-shaped rod which functions as a beating finger. The long leg of the rod rests atop the outer end portion of the plate. It is clamped in an operating position by a simple readily applicable and removable clevis. Inwardly of the clevis keeper holes are provided to selectively and accommodatingly receive a laterally bent end portion of the long leg, said end portion functioning as a keeper. It is simply fitted into a selected keeper hole and the clevis is tightened and the L-shaped rod or finger is ready to function.

Figure 2:
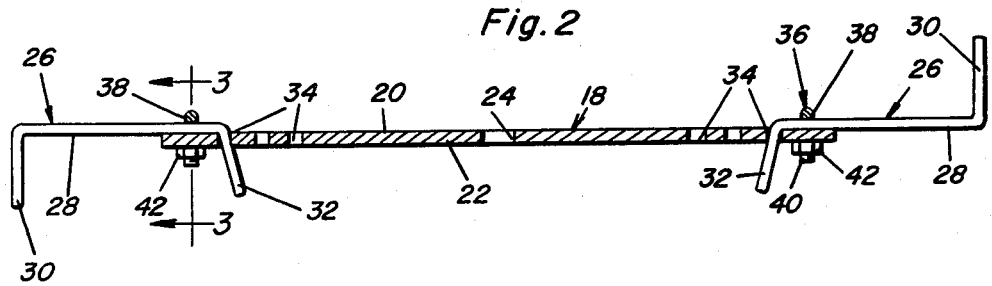
Figure 3:
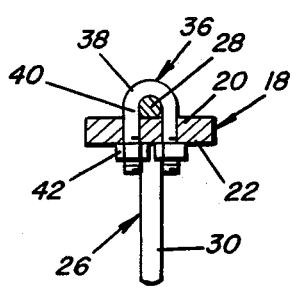

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective showing a fragmentary portion of a power type lawn mower including the housing, power means and with the housing broken away to expose the novel attachment, the latter constructed in accordance with the principles of the present invention;

FIGURE 2 is a view showing the bar-like plate in section the clevises in section and elevation and illustrating the adjustable readily applicable and removable beater fingers in elevation with the outer terminal of one directed upwardly and the corresponding outer terminal of the other one directed downwardly; and FIGURE 3 is an enlarged view in section and elevation taken on the plane of the vertical section line 3—3 of FIGURE 2 looking in the direction of the arrows.

With reference now to FIG. 1 the lawn mower housing is denoted generally by the numeral 6 and comprises a customary wall 10. The power source or means is denoted at 12 and is of suitable construction and is operatively connected therewith to operate the depending cutter blade operating shaft 14, said shaft terminating in a limit stop collar 16. The improved readily applicable and removable attachment is denoted as an entity by the numeral 18. It comprises the linearly straight elongated blade-like bar or plate of a somewhat conventional shape having upper and lower planar or flat sides 20 and 22 and being provided at its center with a stud or bolt hole 24 by way of which it can be bolted or equivalently mounted (not detailed) on the lower end of the power shaft 14. Both rounded end portions of the plate are the same in construction. Each end is provided with the improved beating, anti-clogging and pulverizing means. Each such means is denoted as an entity by the numeral 26. Each means or device comprises a spring steel substantially L-shaped rod whose long leg or limb is denoted at 28, the short leg being designated at 30. These component parts 28 and 30 constitute and function as a simple mechanical finger. The inner end of the leg is laterally bent, preferably at a slight diagonal angle, as at 32 to provide what is here designated as a keeper. This keeper can be selectively positioned and retained in any one of the chosen keeper holes 34 provided in row alignment at the cooperating outer end portion of the mower blade. The keeper-equipped end portion of the long leg is positioned atop the end portion of the surface 20 and is securely clamped and held in place by a clevis 36. This clevis comprises a U-shaped bolt 38 the bight portion of which is fitted over the coacting portion of the leg 20, the arm portion 40 passing downwardly through the holes provided therefor and being threaded to accommodate and permit attachment thereto of suitable assembling and clamping nuts 42.

As previously suggested when one desires to bring this novel time and labor saving attachment into use it is, of course, necessary to detach the conventional cutter blade (not shown) and replace it with the improved novelly functioning substitute blade-like bar or plate 18. When the latter is in the position illustrated in FIG. 1 the outer rounded end portions thereof terminate radially inward of the interior side of the skirt-like wall or flange 10. The beater devices or fingers 26 are installed and clamped in place by the clevises in the manner shown. The overall improved result desired is attained by having the terminal finger 30 directed upwardly at one end of the support plate 18 and oppositely or downwardly at the other end of the same as is shown in FIGS. 1 and 2. The fact that the device 26 is readily attachable and detachable by way of the clevis it will be clear that it can be adjusted and clamped in place at will. When the attachment is in place and in readiness for operation as shown in FIG. 1 it is evident that it whips around the intended path and sweeps up and cleans the blades of grass much in the manner of a rotary rake. In addition it beats and flails the grass (leaves and debris) in such a manner that raking after mowing is unnecessary. In addition and this is important, it keeps the mower blade housing relatively free of caked lawn debris, thus eliminating frequent clearing and cleaning of the blade housing. In fact, experience has shown that it accomplishes adequate lawn cleaning and effectually does what it is supposed to do.

It is of significance here to stress the fact that raking of leaves and grass cuttings is not necessary. In fact, by permitting the mulched cuttings to remain atop the mowed grass they act as a fertilizer. In an instance where the power mower (as marketed and sold) is equipped with mulching shields, the latter are not to be detached. In fact this invention greatly contributes to the mulching result.

It is also a matter of significance to note that each laterally directed inner and outer prong of each beater unit and finger has a special purpose. The ones identified at 30 and 32 (FIG. 2) which are turned down stir up the leaves and dead grass and debris and force the same upward within the confines of the space of the walled housing and the upwardly bent prong 30 (at the right in FIG. 2) takes over and beats and mulches the whirling mass. The blade-type bar or support 18 minus vertical and projecting top and bottom prongs would not achieve the desired distintegrating and mulching to any degree of effectiveness. It follows that to achieve effective mulching both prong-equipped finger units 26 mounted on the respective outer or terminal end portions of the bar must be present with the outermost prongs oriented and coordinated with each other, the bar and walls of the housing, with one bent upward and the other one downward. Then, too, and as will be evident, the finger units 26 are not only readily applicable and removable but are effectually adjustable. Further, the bar 18 with the unit 26 held thereon by clevises 36 can be reversed, that is, turned upside down and used with adequate effectiveness.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a power-operated rotary-type lawn mower, in combination, a housing having a horizontal top wall marginally surrounded by a vertically depending complemental skirt-like wall, a rotary power-driven shaft depending from a central axial portion of said top wall into the wall enclosed space of said housing, and a dead leaf gathering, disintegrating and mulching attachment, said attachment comprising a rigid horizontal bar mounted intermediate its ends on a lower end of said power driven shaft, said bar replacing the conventional removable mower blade and disposed parallel to said top wall and confined in said space, said bar having terminal end portions terminating short of and spaced radially inward from the encompassing skirt-like wall, leaf agitating, beating and pulverizing fingers detachably, adjustably mounted on the terminal end portions of said bar, each of said fingers comprising a spring steel rod having inner and outer ends both of which are disposed relative to said terminal end portions and walls of said housing to disintegrate and mulch leaves trapped in said space.

2. The structure according to claim 1, and wherein said spring steel rod is of a cross-section appreciably less than the transverse cross-section of said bar, the major portion of each finger being L-shaped in elevation, the outer ends of said fingers sweeping through a circular orbital path in proximity to and generally parallel with the interior of said skirt-like wall.

3. The structure defined in claim 2, and wherein the outer end of one finger extends angularly upwardly from the top of said bar and terminates short of said top wall, and the outer end of the other finger depends vertically below the bottom of said bar.

4. The structure according to claim 3, and wherein the outer end portions of said bar are provided with selectively usable keeper holes and associatively cooperable clevises holding said fingers in place, the aforementioned inner ends of said fingers constituting prong-like fingers, the latter extending downwardly through and beyond the respectively usable keeper holes.

5. An attachment for the rotary driven vertical mower blade shaft of a horizontal rotary-type power operated lawn mower comprising: an elongated rigid bar, rectangular in plan and having reversible top and bottom flat surfaces and also having a hole midway between its respective terminal ends for operative connection with a driving end of said shaft, said bar being provided at each outer end portion with a readily applicable and removable clevis and further provided inwardly of each clevis with a row of selectively usable keeper holes, a spring steel L-shaped rod applicable to each outer end portion, said rods constituting agitating, flailing and pulverizing fingers, an inner end portion of the long leg of each rod resting atop an outer end portion of said bar and being clamped in an operating position by said clevis, the inner end portion of said long leg terminating in a laterally directed downbent prong fitting selectively into one of the keeper holes provided therefor, and the short leg of said rod being disposed in a plane at right angles to the plane of said bar, said bar when in use being adapted to assume and rotate in a horizontal plane, one short leg being upwardly directed and vertical to the horizontal plane of the top side of said bar, the other short leg being directed downwardly and assuming a plane vertical to the horizontality of said bar.

References Cited by the Examiner

UNITED STATES PATENTS

| | | | |
|---|---|---|---|
| 2,588,599 | 3/52 | Winter | 56—377 |
| 2,707,859 | 5/55 | Walker | 56—295 |
| 2,891,369 | 6/59 | Rietz | 56—295 X |
| 3,018,602 | 1/62 | Diesterweg | 56—295 |

T. GRAHAM CRAVER, *Primary Examiner.*
ANTONIO F. GUIDA, *Examiner.*